United States Patent
Amaike et al.

[11] Patent Number: 5,637,270
[45] Date of Patent: Jun. 10, 1997

[54] APPARATUS AND METHOD FOR MANUFACTURING A RESIN STRUCTURE REINFORCED WITH LONG FIBERS

[75] Inventors: Takeshi Amaike, Fuji; Yoshimitsu Shirai, Shizuoka, both of Japan

[73] Assignee: Polyplastics Co., Ltd., Japan

[21] Appl. No.: 531,331

[22] Filed: Sep. 20, 1995

[30] Foreign Application Priority Data

Sep. 22, 1994 [JP] Japan .................................. 6-252762

[51] Int. Cl.$^6$ .............................. B29C 70/52; B29C 70/54
[52] U.S. Cl. ............... 264/136; 264/171.13; 264/171.23; 264/171.24; 425/113; 425/325; 425/377
[58] Field of Search ................. 264/70, 136, 171.13, 264/171.23, 171.24, 444; 425/113, 325, 377

[56] References Cited

U.S. PATENT DOCUMENTS

| | | |
|---|---|---|
| 3,053,717 | 9/1962 | Bright . |
| 3,993,726 | 11/1976 | Moyer . |
| 4,541,884 | 9/1985 | Cogswell et al. . |
| 4,549,920 | 10/1985 | Cogswell et al. . |
| 4,559,262 | 12/1985 | Cogswell et al. . |
| 4,892,600 | 1/1990 | Beever . |
| 5,019,450 | 5/1991 | Cogswell et al. . |
| 5,213,889 | 5/1993 | Cogswell et al. . |

FOREIGN PATENT DOCUMENTS

| | | | |
|---|---|---|---|
| 0 216 122 A1 | 8/1986 | European Pat. Off. . | |
| 48-3536 | 1/1973 | Japan | 264/136 |
| 57-181852 | 11/1982 | Japan . | |
| 1229063 | 5/1986 | U.S.S.R. | 264/136 |

*Primary Examiner*—Leo B. Tentoni
*Attorney, Agent, or Firm*—Nixon & Vanderhye PC

[57] ABSTRACT

Apparatus and method for manufacturing a resin structure reinforced with long fibers by impregnating a continuous fiber bundle with a molten resin, shaping the resin-impregnated continuous fiber bundle so as to have a cross section of an intended final product; and then taking up the resin-impregnated and shaped continuous fiber bundle shaped with upper and lower endless belts or rolls. A comb-shaped structure is positioned at a location on an upstream side of the endless belts or rolls so as to hold the resin-impregnated continuous fiber bundle between two adjacent teeth thereof. The comb-shaped structure is oscillated in a widthwise direction of the endless belts or rolls with the resin-impregnated continuous fiber bundle held between the two adjacent teeth thereof so as to responsively oscillate the resin-impregnated continuous fiber bundle in the widthwise direction of the endless belts or rolls.

6 Claims, 1 Drawing Sheet

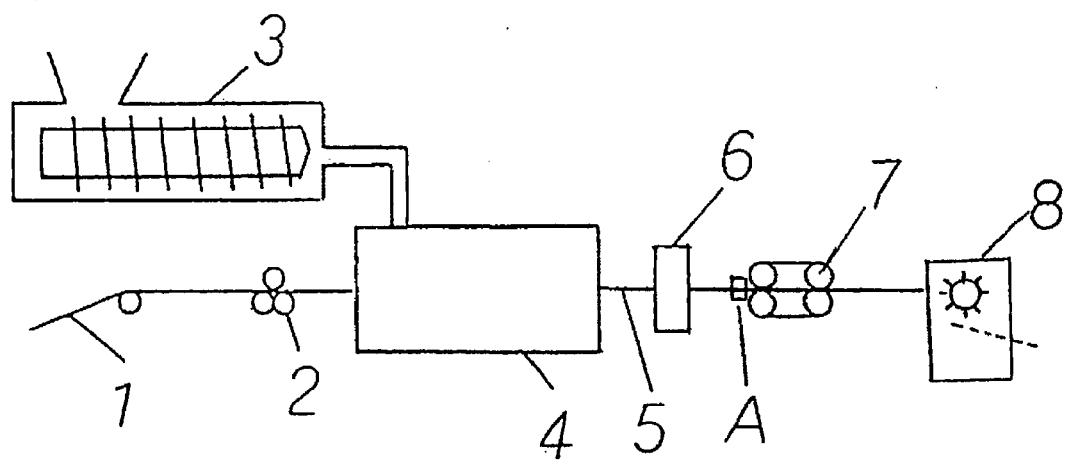
Fig. 1
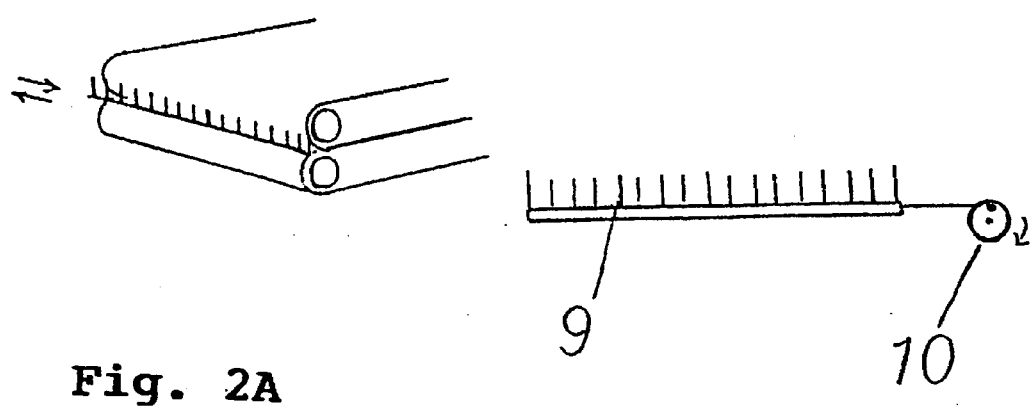
Fig. 2A
Fig. 2B

APPARATUS AND METHOD FOR MANUFACTURING A RESIN STRUCTURE REINFORCED WITH LONG FIBERS

BACKGROUND OF THE INVENTION

1. Field of the Invention

The present invention relates to an apparatus and a method for manufacturing a resin structure reinforced with long fibers. More particularly, the invention relates to an apparatus and a method for manufacturing a resin structure reinforced with long fibers in which an oscillation mechanism for varying the position at which a resin-impregnated continuous fiber bundle is taken up is provided, thereby preventing an uneven abrasion of an endless belt or a roll of the take-up apparatus and enabling a long-term continuous operation.

2. Background of the Invention

Resin structures reinforced with long fibers in which thermoplastic resins are reinforced with continuous fibers have become of much interest in recent years, since they have physical characteristics much superior to those reinforced with short fibers. They are generally manufactured by a so-called pultrusion method in which a continuous reinforcing fiber bundle is impregnated with a thermoplastic resin while the fiber bundle is drawn through a cross-head extruder and then pulled through a die (U.S. Pat. No. 3,993,726), or a continuous reinforcing fiber bundle is immersed in a thermoplastic resin melt to wet it while it is drawn and then pulled through a die (Japanese Patent Application Laid-open (kokai) No. 57-181852).

In the manufacture of a resin structure reinforced with long fibers, in order to have a continuous fiber bundle uniformly impregnated with a matrix resin while drawing the fiber bundle, a take-up step is required in a downstream section for taking up a resin-impregnated continuous fiber bundle. This take-up step is performed in such a manner that a resin-impregnated continuous fiber bundle is sandwiched between upper and lower endless belts which are generally driven by rolls or between a pair of rolls. Generally, the resin-impregnated continuous fiber bundle passes through a shaping die immediately after an impregnation step, during which uniform impregnation is obtained and the cross section of the fiber bundle becomes to have a shape of the target product. Accordingly, in the take-up step, the fiber bundle is required to have a certain hardness so that the shape imparted at the entrance section of the take-up step is not deformed. Moreover, from the viewpoint of easy operation, it is preferred that the fiber bundle be cooled to solidify rather than being in a soft state when a resin-impregnated continuous fiber bundle is being taken up.

A take-up apparatus transfers a resin-impregnated continuous fiber bundle by the rotation of take-up rolls while imparting the fiber bundle with tension. Usually, a resin-impregnated continuous fiber bundle is sandwiched between two take-up rolls which have endless belts passed around them and which are disposed in an upper and lower relation facing each other. The fiber bundle is securely held as it is pressurized between the two take-up rolls, and the rotation of the rolls causes the resin-impregnated continuous fiber bundle to pass through a shaping die in the direction from the upstream side of the take-up roll to the downstream side of the roll. On the other hand, the resin-impregnated continuous fiber bundle is usually solidified as described before from the viewpoint of easiness in operation, etc. In order to take up each resin-impregnated continuous fiber bundle, the endless belts must have sufficient strength and softness to some extent. To meet these requirements, the endless belts are usually made of a rubber-reinforced plastic, elastomer, thermoplastic elastomer, and a natural rubber. The use of such materials, however, tends to cause a deformation due to the pressure applied for securing the resin-impregnated continuous fiber bundle. Moreover, since friction occurs due to the pressure and tension for taking up, and since the resin-impregnated continuous fiber bundle is always carried by the same portion of each endless belt, the belt is unevenly ground by the fiber bundle to form a rut. The rut gradually becomes deeper to finally reach the situation that the endless belts can no longer apply sufficient pressure to the resin-impregnated continuous fiber bundle and therefore it becomes difficult to take up the fiber bundle. If such a situation occurs, the endless belts are planed to obtain a flat surface for the purpose of reuse, or the belts are replaced with new ones. However, planing and exchanging are cumbersome and costly. In addition, during a planing or exchanging operation, manufacture of resin-impregnated continuous fiber bundles must be stopped, causing a reduction in productivity. These problems also happen when a pair of rolls are employed as the take-up apparatus. Accordingly, it is desired to develop an apparatus for manufacturing a resin structure reinforced with long fibers equipped with a take-up apparatus in which the whole surfaces of endless belts or rolls can be utilized, thereby reducing uneven abrasion and prolonging the service life of the endless belts or rolls.

In view of the forgoing situation, the inventors of the present invention studied in detail focusing on the take-up section for a resin-impregnated continuous fiber bundle in an apparatus for manufacturing a resin structure reinforced with long fibers, and as a result, found that the aforementioned problems can be solved by varying the contact point between an endless belt or a roll and a resin-impregnated continuous fiber bundle during a take-up step. The present invention was completed based on this finding.

SUMMARY OF THE INVENTION

Accordingly, the present invention provides an apparatus for manufacturing a resin structure reinforced with long fibers which comprises an impregnation means for impregnating a continuous fiber bundle with a resin melt while continuously taking up the fiber bundle; a shaping means for shaping the resin-impregnated continuous fiber bundle so as to have a cross section of an intended final product; a take-up means for taking up the resin-impregnated continuous fiber bundle which has been shaped, the take-up means having upper and lower endless belts or rolls; and an oscillation mechanism which oscillates the resin-impregnated continuous fiber bundle in the width direction of the endless belts or the rolls and which is placed at a location on the upstream side of the endless belts or the rolls.

Preferably, the oscillation mechanism has a comb-shaped structure and the resin-impregnated continuous fiber bundle is held between two adjacent teeth of the comb-shaped structure for oscillating the continuous fiber bundle.

Preferably, the oscillation mechanism has a crank mechanism or an air cylinder as the oscillation source.

The present invention also provides a method for manufacturing a resin structure reinforced with long fibers, which comprises an impregnation step for impregnating a continuous fiber bundle with a molten resin; a shaping step for shaping the resin-impregnated continuous fiber bundle so as to have a cross section of an intended final product; a take-up step for taking up, with a take-up means having upper and lower endless belts or rolls, the resin-impregnated continuous fiber bundle which has been shaped; wherein the resin-impregnated continuous fiber bundle is oscillated in the width direction of the endless belts or the rolls with a oscillating means placed at a location on the upstream side of the endless belts or the rolls.

The above and other objects, features, and advantages of the present invention will become apparent from the following description which has been made in connection with the accompanying drawings.

BRIEF DESCRIPTION OF THE DRAWINGS

FIG. 1 is a diagrammatic illustration showing an example of the steps of manufacturing a pellet-shaped resin structure reinforced with long fibers using the apparatus of the present invention;

FIG. 2A is a sketch showing a part of the take-up apparatus of the present invention with an oscillation mechanism being disposed on the upstream side of the take-up rolls; and FIG. 2B is a sketch showing the oscillation mechanism which has a comb-shaped structure and which uses a crank as the oscillation source.

DESCRIPTION OF THE INVENTION AND PREFERRED EMBODIMENTS

An exemplary scheme of the steps for manufacturing a pellet-shaped resin structure reinforced with long fibers using the apparatus of the present invention for manufacturing a resin structure reinforced with long fibers is shown in FIG. 1. In FIG. 1, 1 is a fiber bundle taken out of a roving. The fiber bundle is preferably twist-free. 2 is a roll bar, 3 is an extruder which supplies a thermoplastic resin melt, 4 is a cross-head die for impregnating the fiber bundle 1 with a thermoplastic resin melt (impregnating means), 5 is a fiber bundle which has been impregnated with a thermoplastic resin melt, 6 is a shaping die, 7 is a take-up roll, A is an oscillation mechanism for a resin-impregnated continuous fiber bundle, and 8 is a pelletizer.

The fiber species of the fiber bundle is not particularly limited in the present invention. For example, any high melting point fibers such as glass fibers, carbon fibers, metal fibers, or aromatic polyamide fibers may be used. Although these fibers are generally treated with a surface treatment agent (binder), such treatment may not necessarily be required. Among the fibers, glass fibers are preferable in view of the strength and price of the resulting resin structure reinforced with long fibers. In addition, a preferable Tex number of the continuous fiber bundle used in the present invention is normally from 4,400 to 120, and more preferably from 2,200 to 740.

Fiber bundle 1 is loosened in the fiber loosening step with roll bars 2. In FIG. 1, roll bars are used. However, other fiber-loosening means may also be used, such as static electricity, blown air (air jet), a water jet, a tension bar, and a needle punch.

In the present invention, no limitation is imposed on the impregnating method adopted in the impregnation step for manufacturing a resin-impregnated continuous fiber bundle. For example, an impregnation die such as a cross-head die in FIG. 1 or an impregnating vessel may be used, and any impregnation method known in the art may also be used. Particularly, use of an impregnation die such as a cross-head die is recommended.

In the present invention, the resin used for impregnating the fiber bundle is generally a thermoplastic resin, either crystalline or amorphous. Examples of the thermoplastic resin include polyolefins such as polyethylene and polypropylene; polyesters such as polyethylene terephthalate and polybutylene terephthalate; polyamides such as nylon 6, nylon 66, nylon 11, nylon 12, nylon 610 and nylon 612; polyacetals; polycarbonates, thermoplastic polyurethanes, polyphenylene sulfides, polyphenylene oxides, polysulfones, polyetherketones, polyetheramides, polyetherimides, acrylonitrile/styrene resins, and combinations of these thermoplastic resins.

A continuous fiber bundle impregnated with a thermoplastic resin melt at the cross-head die 4 passes through the shaping die 6, during which the fiber bundle is shaped to have a desired shape such as a strand, rod, ribbon, tape, sheet, plate, or any other special shape. At the same time, it is uniformly impregnated with the thermoplastic resin and the impregnation is accelerated. The resin-impregnated continuous fiber bundle is took up with a take-up roll 7 after passing through the shaping die 6. In FIG. 1, an endless belt is passed around each of the take-up rolls 7. A resin-impregnated continuous fiber bundle is sandwiched between the two take-up rolls to take up a resin-impregnated continuous fiber bundle by the rotation of the take-up rolls 7.

According to the present invention, an oscillation mechanism for oscillating a resin-impregnated continuous fiber bundle in the width direction of each endless belt is provided in the take-up apparatus. The oscillating mechanism A varies the position at which the resin-impregnated continuous fiber bundle is taken up into the take-up rolls 7 by oscillating the fiber bundle in the direction of the endless belt. As a result, formation of ruts or uneven abrasion is prevented since the resin-impregnated continuous fiber bundle does no more contact the same points of the endless belts passed around the take-up rolls 7. This means is also effective when the take-up apparatus is composed of a pair of rolls.

It is preferred that the oscillation means A securely hold the resin-impregnated continuous fiber bundles by means of a comb-shaped structure for holding them in a parallel manner (FIG. 2A) or through holes for passing the fiber bundles therethrough. This is because when each resin-impregnated continuous fiber bundle or a set of several resin-impregnated continuous fiber bundles is securely held between two adjacent teeth of the comb-shaped structure of the oscillating mechanism, or through each through hole, the take-up position can be varied on the endless belts or rolls in a reliable manner when the fiber bundles are oscillated with the oscillation mechanism.

The oscillation mechanism for the take-up apparatus has any type of an oscillation source. Preferable oscillation sources are cranks (FIG. 2B) and air cylinders (not shown). Since tension is applied to the resin-impregnated continuous fiber bundle during the take-up operation, a certain level of power is required for effecting an oscillation. When a crank or an air cylinder is used, a stable and consistent oscillation can be provided in the width direction of the endless belts or rolls (the direction indicated by the arrow in FIG. 2A).

The thus-taken up resin structure reinforced with long fibers is cut to an arbitrary length to form pellets with a pelletizer 8. Subsequently, the pellets are molded or submitted to a further processing. The pellets contain reinforcing fibers which have substantially the same length as the pellets and which are generally aligned in parallel to the longitudinal direction of the pellets.

The composition, such as the fiber content, of the resin structure reinforced with long fibers obtained as above is not particularly limited. In view of various characteristics of the resulting resin structure, however, it is generally preferred that the fiber content be from 20 to 80% by weight (in the structure), and particularly from 30 to 70% by weight.

The resin structure reinforced with long fibers according to the present invention may contain optional ingredients which are generally incorporated into resins. Such optional ingredients include anti-oxidants, UV absorbers, antistatics, impregnation facilitating agents, plasticizers, mold releasing agents, fire retardants, fireproofing aids, crystallizing accelerators, colorants, inorganic fillers, and organic fillers.

As described above, in the apparatus for manufacturing a resin structure reinforced with long fibers of the present invention, there is provided, on the upstream side of the take-up apparatus section, an oscillation mechanism for varying the take-up position of the resin-impregnated continuous fiber bundle, i.e, for varying the contact point between the fiber bundle and each endless belt or roll. As a result, formation of ruts or uneven abrasion on the endless belts or rolls is prevented to prolong the service life of the belts or rolls.

What is claimed is:

1. An apparatus for manufacturing a resin structure reinforced with long fibers which comprises:

an impregnation mechanism for impregnating a continuous fiber bundle with a resin melt while continuously taking up the fiber bundle;

a shaping mechanism for shaping the resin-impregnated continuous fiber bundle so as to have a cross section of an intended final product;

a take-up mechanism which includes upper and lower endless belts or rolls for taking up the resin-impregnated continuous fiber bundle which as been shaped; and an oscillation mechanism which is positioned upstream of the endless belts or rolls for oscillating the resin-impregnated continuous fiber bundle in a widthwise direction of the endless belts or rolls, wherein the oscillation mechanism includes a comb-shaped structure, and wherein the resin-impregnated continuous fiber bundle is held between two adjacent teeth of the comb-shaped structure when the continuous fiber bundle is oscillated.

2. The apparatus according to claim 1, wherein the oscillation mechanism includes a crank, and wherein the comb-shaped structure is oscillated by movement of the crank.

3. The apparatus according to claim 1, wherein the oscillation mechanism includes an air cylinder, and wherein the comb-shaped structure is oscillated by movement of the air cylinder.

4. A method for manufacturing a resin structure reinforced with long fibers, which comprises the steps of:

(a) impregnating a continuous fiber bundle with a molten resin;

(b) shaping the resin-impregnated continuous fiber bundle so as to have a cross section of an intended final product; and (c) taking up the resin-impregnated continuous fiber bundle shaped according to step (b) with upper and lower endless belts or rolls, wherein prior to said taking up step (c), there are practiced the steps of, (i) positioning a comb-shaped structure upstream of the endless belts or rolls;

(ii) holding the resin-impregnated continuous fiber bundle between two adjacent teeth of the comb-shaped structure positioned according to step (i); and (iii) oscillating the comb-shaped structure in a widthwise direction of the endless belts or rolls with the resin-impregnated continuous fiber bundle held between said two adjacent teeth thereof according to step (ii) so as to responsively oscillate the resin-impregnated continuous fiber bundle in said widthwise direction.

5. A method as in claim 4, where said oscillating step (ii) includes moving a crank structure which is operatively connected to said comb-shaped structure.

6. A method as in claim 4, wherein said oscillating step (ii) includes moving an air cylinder which is operatively connected to said comb-shaped structure.

* * * * *